United States Patent
Miernik et al.

(10) Patent No.: US 8,103,275 B2
(45) Date of Patent: Jan. 24, 2012

(54) SYSTEM AND METHOD FOR IDENTIFYING A WIRELESS SERVING NODE FOR A MOBILE UNIT

(75) Inventors: Jerzy W. Miernik, Allen, TX (US); Alexander G. Garbuz, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 708 days.

(21) Appl. No.: 11/617,161

(22) Filed: Dec. 28, 2006

(65) Prior Publication Data

US 2007/0105555 A1   May 10, 2007

Related U.S. Application Data

(63) Continuation of application No. 10/046,466, filed on Jan. 11, 2002, now Pat. No. 7,177,641.

(51) Int. Cl.
*H04Q 7/20* (2006.01)

(52) U.S. Cl. .................................. 455/435.1; 370/331

(58) Field of Classification Search ................ 455/452.2
See application file for complete search history.

(56) References Cited

U.S. PATENT DOCUMENTS

| | | | | |
|---|---|---|---|---|
| 4,363,093 A * | 12/1982 | Davis et al. | .................... | 709/227 |
| 4,926,495 A | 5/1990 | Comroe et al. | ............... | 455/508 |
| 5,638,448 A * | 6/1997 | Nguyen | ......................... | 380/29 |
| 5,657,375 A | 8/1997 | Connolly et al. | ............. | 455/436 |
| 5,878,036 A * | 3/1999 | Spartz et al. | .................. | 370/335 |
| 5,901,352 A * | 5/1999 | St-Pierre et al. | ........... | 455/426.1 |
| 6,014,558 A | 1/2000 | Thomas | ........................ | 455/410 |
| 6,041,358 A | 3/2000 | Huang et al. | .................. | 709/238 |
| 6,112,249 A * | 8/2000 | Bader et al. | .................... | 709/239 |
| 6,377,807 B1 | 4/2002 | Iparrea et al. | ................. | 455/445 |
| 6,385,204 B1 | 5/2002 | Hoefelmeyer et al. | ....... | 370/401 |
| 6,603,968 B2 | 8/2003 | Anvekar et al. | .............. | 455/433 |
| 6,665,537 B1 | 12/2003 | Lioy | ............................. | 455/435 |
| 6,721,291 B1 | 4/2004 | Bergenwall et al. | .......... | 370/331 |

(Continued)

FOREIGN PATENT DOCUMENTS

EP   0 987 860 A2   3/2000

(Continued)

OTHER PUBLICATIONS

Digital Cellular Telecommunications System (Phase 2+) (GSM); Universal Mobile Telecommunications System (UMTS); General Packet Radio Service (GPRS); Service Description; Stage 2 (3GPP TS 23.060 version 3.6.0 Release 1999), ETSI TS 123 060 V3.6.0 (Jan. 2001) Technical Specification, *European Telecommunications Standards Institute*, 2001. 184 pages.

(Continued)

*Primary Examiner* — Dwayne Bost
*Assistant Examiner* — Joseph Dean, Jr.
(74) *Attorney, Agent, or Firm* — Baker Botts L.L.P.

(57) ABSTRACT

A system and method for identifying a wireless serving node for a mobile unit include the ability to receive a wireless registration request at a control node for a wireless serving node cluster and determine a control node associated with the registration request by using an algorithm on a mobile unit identifier in the registration request. The system and method also include the ability to generate a wireless registration response containing an identifier for the control node associated with the registration request if the control node is not the control node associated with the registration request.

30 Claims, 3 Drawing Sheets

U.S. PATENT DOCUMENTS

| | | | |
|---|---|---|---|
| 6,728,237 B2 * | 4/2004 | Helander | 370/352 |
| 6,728,300 B1 | 4/2004 | Sarkar et al. | 375/147 |
| 6,816,908 B1 | 11/2004 | Usmani | 709/229 |
| 6,957,071 B1 * | 10/2005 | Holur et al. | 455/452.2 |
| 7,006,450 B2 * | 2/2006 | Kuster et al. | 370/252 |
| 2003/0028649 A1 * | 2/2003 | Uhlik et al. | 709/228 |
| 2003/0053430 A1 | 3/2003 | Choi et al. | 370/331 |
| 2003/0119480 A1 | 6/2003 | Mohammed | 455/411 |

FOREIGN PATENT DOCUMENTS

| WO | WO 01/38983 A2 | 5/2001 |
|---|---|---|

OTHER PUBLICATIONS

PCT International Search Report in International Application No. PCT/US 03/00487, dated May 22, 2003, 7 pages.

"*3GPP2 Access Network Interfaces Interoperability Specification*", 3GPP2 A.S0001-A, 3rd Generation Partnership Project 2 "3GPP2", Nov. 30, 2000, 1,028 pages.

"*Packet Data Serving Node and Foreign Agent Control Node*", CommWorks, a 3Com Company, 2 pages, date unknown.

"*3G cdma2000*", CommWorks, a 3Com Company, 2 pages, date unknown.

"*2G cdmaOne*", CommWorks, a 3Com Company, 2 pages, date unknown.

Data Sheet, "*CommWorks® 3G Data System for cdma2000 Wireless Networks*", CommWorks, a 3Com Company, 4 pages, Jun. 2001.

"*Home Agent and Home Agent Control Node*", CommWorks, a 3Com Company, 2 pages, date unknown.

"*Wireless Network Management*", CommWorks, a 3Com Company, 2 pages, date unknown.

"*Authentication, Authorization, and Accounting: AAA Server*", CommWorks, a 3Com Company, 2 pages, date unknown.

Nee, Cheng-Lee (nmi), et al, "*System and Method for Efficient Selection of a Packet Data Servicing Node*", U.S. Appl. No. 09/909,699, filed Jul. 20, 2001, 24 pages of Specification, including 20 Claims and Abstract, and 2 sheets of drawings.

Miernik, Jerzy W., "*System and Method for Selecting a Wireless Serving Node*", U.S. Appl. No. 10/015,334, filed Dec. 11, 2001, 57 pages of Specification, including 61 Claims and Abstract, and 6 sheets of drawings.

* cited by examiner

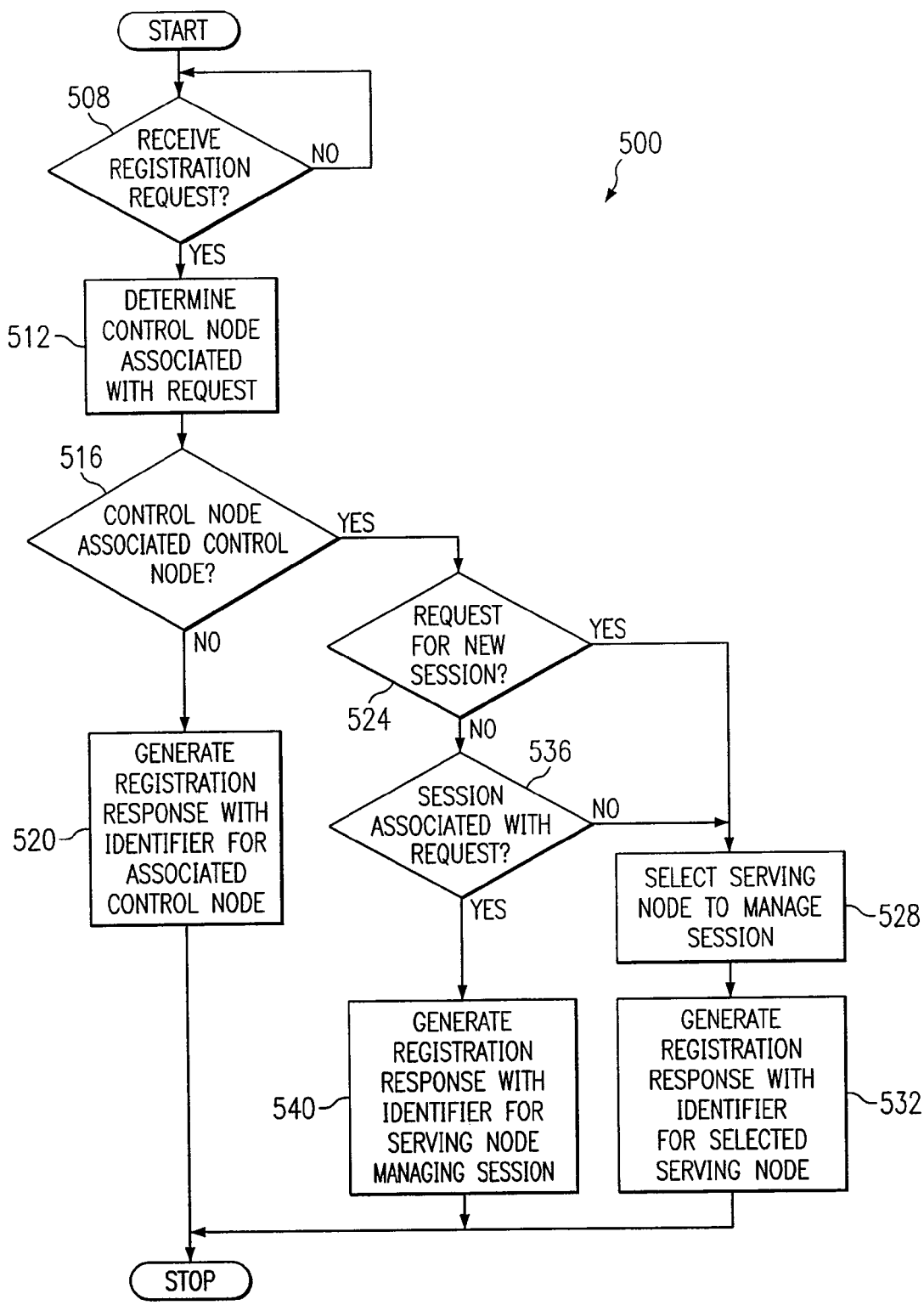

SYSTEM AND METHOD FOR IDENTIFYING A WIRELESS SERVING NODE FOR A MOBILE UNIT

CROSS-REFERENCE TO RELATED APPLICATION

This application is a continuation of U.S. application Ser. No. 10/046,466 filed Jan. 11, 2002 and entitled "System and method for Identifying a Wireless Serving Node for a Mobile Unit".

TECHNICAL FIELD OF THE INVENTION

This invention relates in general to wireless communication systems, and, more particularly, to a system and method for identifying a wireless serving node for a mobile unit.

BACKGROUND OF THE INVENTION

Modern communication systems allow individuals to stay in communication as they move about. The most notable device for this is the cellular telephone, which allows people to communicate verbally with each other. There is, however, a whole other range of communications that people use in their daily lives that are not as well developed for mobile use—the sending and receiving of data, such as, for example, over the Internet.

To address this need, modern communication systems include wireless devices that are capable of initiating data sessions through serving nodes coupled to a network. The wireless devices may then receive data, such as, for example, stock quotes, advertisements, and/or e-mails, from various service providers.

In existing networks, when a wireless device moves from one location to another, a new wireless and/or data link may have to be established to service the device. While establishing a new wireless link may be accomplished quite readily, establishing a new data link may take significantly longer, which may result in a significant loss of data and/or annoyance to the user of the device.

To solve this problem, serving nodes have been built that can handle more data links, thereby lowering the probability that a wireless device will have to establish a data link to a different serving node when moving between locations. Another solution is to have each serving node send data regarding the wireless sessions that it is managing to the other serving nodes. Accordingly, each serving node would know which serving node is managing a wireless session for the wireless device upon detecting a registration request for it.

SUMMARY OF THE INVENTION

The present invention provides a system and method for identifying a wireless serving node for a mobile unit. In particular embodiments, the present invention identifies the wireless serving node for the mobile unit while conserving the memory and processing resources on the wireless serving nodes and while achieving inter-cluster and intra-cluster load balancing.

In accordance with one embodiment of the present invention, a method for identifying a wireless serving node for a mobile unit includes receiving a wireless registration request at a control node for a wireless serving node cluster and determining a control node associated with the registration request by using an algorithm on a mobile unit identifier in the registration request. The method also includes generating a wireless registration response containing an identifier for the control node associated with the registration request if the control node is not the control node associated with the registration request.

In accordance with another embodiment of the present invention, a set of logic for identifying a wireless serving node for a mobile unit is encoded in media and includes the ability to receive a wireless registration request at a control node for a wireless serving node cluster and determine a control node associated with the registration request by using an algorithm on a mobile unit identifier in the registration request. The logic also includes the ability to generate a wireless registration response containing an identifier for the control node associated with the registration request if the control node is not the control node associated with the registration request.

In accordance with still another embodiment of the present invention, a system for identifying a wireless serving node for a mobile unit includes a serving node cluster including a plurality of wireless serving nodes, a control node, and a communication network. Each wireless serving node is operable to manage a plurality of wireless sessions. The control node is operable to receive a wireless registration request for the cluster, determine a control node associated with the registration request by using an algorithm on a mobile unit identifier in the registration request, and generate a wireless registration response containing an identifier for the control node associated with the registration request if it is not the control node associated with the registration request. The communication network is coupled to the serving nodes and the control node and allows the serving nodes and the control node to exchange data.

The present invention has several technical features. For example, a control node that receives a wireless registration request for a mobile unit attempts to determine the appropriate cluster to manage wireless sessions for the mobile unit by using an algorithm on its identifier. Thus, the management of mobile units may be distributed in a controlled manner between serving node clusters and may be achieved without state information exchange. Moreover, using an algorithmic approach simplifies implementation and allows other network elements to assist in making the appropriate selection, which can reduce signaling. Furthermore, by directing registration requests for a mobile to a particular serving node cluster, a data link that may already exist in the cluster may be maintained. Accordingly, a new data link may not have to be established to the mobile unit, which will decrease the time in which data cannot be transmitted. As another example, because the registration requests are directed to the control node for the cluster, the serving nodes do not have to maintain data about the wireless sessions being managed by the other serving nodes in the cluster and/or do not have to try to select a serving node to manage a wireless session, allowing them to conserve memory and processing resources for managing wireless sessions. Moreover, the control node may readily implement a load balancing scheme between the serving nodes in the cluster. As a further example, a serving node cluster may be easily modified since additional serving nodes may be added without significant effect on the capabilities of the serving nodes already in the cluster and/or because serving nodes and control nodes do not have to be co-located. Other technical features include reliability due to redundant controllers and scalability due to linear growth of the number of serving nodes with the number of data sessions, Of course, some embodiments may possess none, one, some, or all of these technical features and/or additional technical features. Other technical features will be readily apparent to those skilled in the art from the figures, description, and claims.

BRIEF DESCRIPTION OF THE DRAWINGS

The figures described below provide a more complete understanding of the present invention and its technical features, especially when considered with the following detailed written description:

FIG. 5 is a flowchart illustrating operations of a control node in accordance with one embodiment of the present invention.

DETAILED DESCRIPTION OF THE INVENTION

Figure 1:
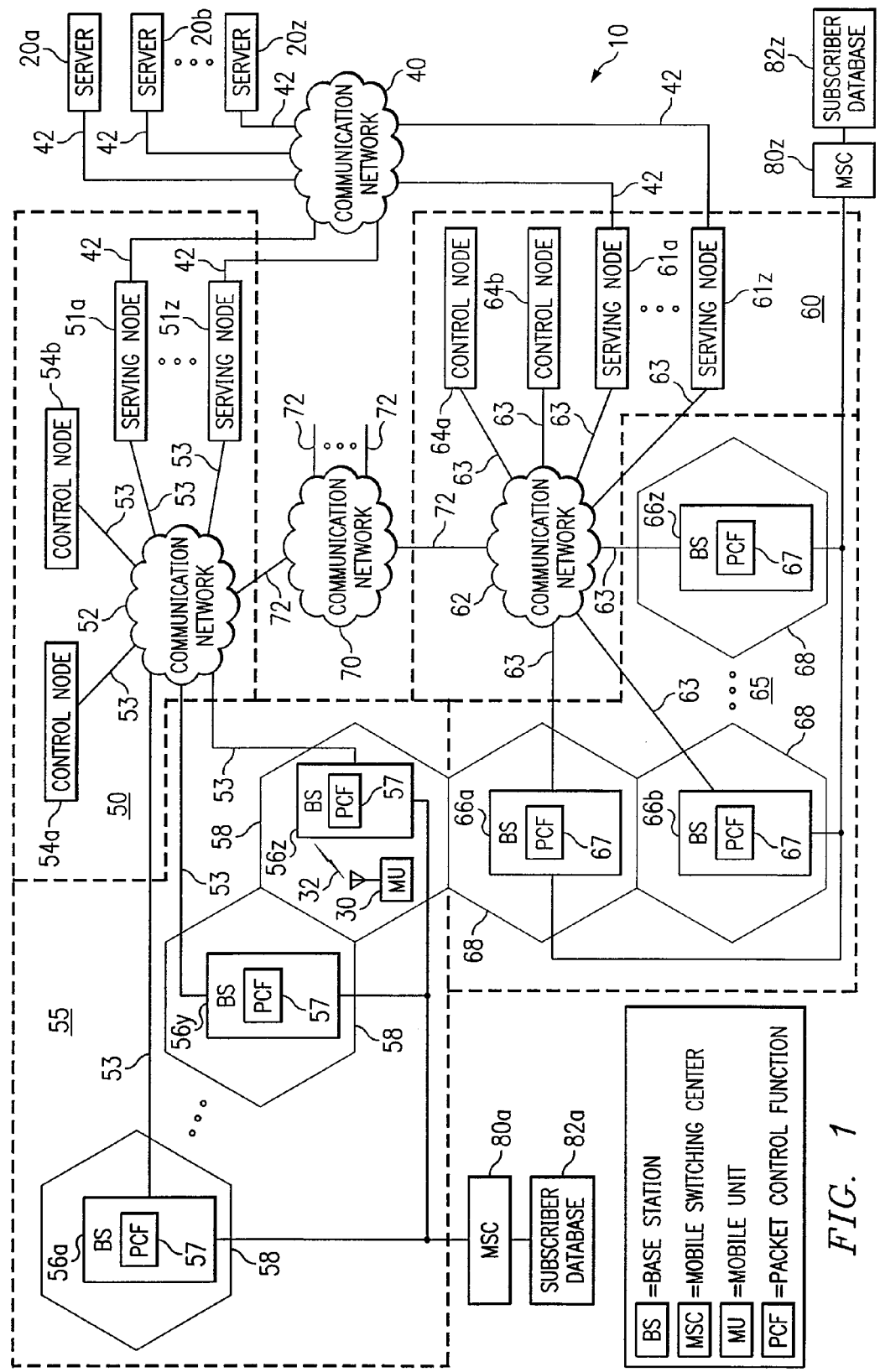
FIG. 1 is a block diagram illustrating a communication system in accordance with one embodiment of the present invention.

FIG. 1 is a block diagram illustrating a communication system 10 in accordance with one embodiment of the present invention. In general, system 10 includes servers 20 that send data to and/or receive data from a mobile unit 30 and a communication network 40, a wireless serving node cluster 50, a radio access network (RAN) 55, a wireless serving node cluster 60, and a RAN 65 for transferring the data between servers 20 and mobile unit 30. Servers 20 may store and/or generate the data to be sent to mobile unit 30 and may provide the data upon request, by using push techniques, or in any other appropriate manner. The data may include video, text, audio, voice, and/or any other type of data.

In more detail, servers 20 may be any type of devices that can send data toward mobile unit 30 and/or assist in managing system 10. For example, servers 20 may include stock quote servers, weather forecast servers, e-mail servers, and/or any other appropriate type of data server. As another example, servers 20 may include an accounting server, a location server, and/or any other suitable server for providing services in system 10. In particular embodiments, one or more of servers 20 may receive data from mobile unit 30. In general, system 10 may have any number and/or type of servers.

To assist one or more of servers 20 in sending data to mobile unit 30, system 10 includes communication network 40. Communication network 40 is coupled to servers 20 by links 42 and is operable to receive data from servers 20 and send it towards mobile unit 30. In particular embodiments, network 40 is also operable to receive data from mobile unit 30 and send it to one or more of servers 20. Communication network 40 may be composed of servers, routers, switches, repeaters, backbones, links, and/or any other appropriate type of communication devices. Links 42 of communication network 40 may be wires, fiber-optic cables, microwave channels, and/or any other appropriate type of wireline and/or wireless links. Links 42 may also include intermediate servers, routers, switches, repeaters, backbones, and/or other communication devices. In general, communication network 40 may be any interconnection found on any communication network, such as a wide area network (WAN), the Internet, or any other data exchange system between two or more computers.

Also assisting in the transfer of data to mobile unit 30 are wireless serving node cluster 50, RAN 55, wireless serving node cluster 60, and RAN 65. In general, one of wireless serving node cluster 50 and wireless serving node cluster 60 receives data over one of links 42 for mobile unit 30 and sends the data to the RAN associated with the serving node cluster for wireless communication to the mobile unit, although in particular embodiments, data may be received from a mobile unit and sent over one of links 42. A RAN may be associated with a serving node cluster based on geography, network connection, logic, and/or any other appropriate type of criteria. Note that each of serving node cluster 50 and serving node cluster 60 typically support numerous mobile units.

Serving node cluster 50 includes wireless serving nodes 51, which are coupled to communication network 40 by links 42. In general, wireless serving nodes 51 are operable to receive data destined for mobile unit 30 from communication network 40 and send the data towards the mobile unit. In particular embodiments, serving nodes 51 may also receive data from mobile unit 30 and send it to communication network 40. In some embodiments, serving nodes 51 may be packet data serving nodes.

In certain embodiments, each of serving nodes 51 includes a home agent and/or a foreign agent for managing communications through them between mobile unit 30 and one of serving nodes 20. Home agents and foreign agents may provide communication between a mobile unit and an end point, such as, for example, another mobile unit, a telephone, one of servers 20, or any other suitable device. A home agent may include a binding table that stores data relating to a mobile unit, such as a mobile unit identifier, a care of address (COA) for the current foreign agent, the internet protocol (IP) address or addresses assigned to the mobile unit, other mobile binding information, and/or any other suitable tunneling characteristics. Similarly, a foreign agent may include a binding table that stores data relating to each corresponding mobile unit. For example, for each corresponding mobile unit, the binding table of the foreign agent may include a mobile unit identifier, an address for the home agent, the IP address or addresses assigned to the mobile unit, other binding mobile information, and any other tunneling characteristics.

Serving node cluster 50 also includes communication network 52 and control nodes 54, which will be discussed in more detail later. Communication network 52 allows serving nodes 51, control nodes 54, and RAN 55 to exchange data with each other. Communication network 52 may be composed of servers, routers, switches, repeaters, backbones, links, and/or any other appropriate type of communication devices. In general, communication network 52 may be any interconnection found on any communication network, such as a wide area network (WAN), the Internet, or any other data exchange system between two or more computers. In particular embodiments, all or a part of communication network 52 may be part of communication network 40. Communication network 52 includes links 53 to serving nodes 51, control nodes 54, and RAN 55. Links 53 may be wires, fiber-optic cables, microwave channels, and/or any other appropriate type of wireline and/or wireless links. Links 53 may include intermediate servers, routers, switches, repeaters, backbones, and/or other communication devices.

RAN 55 includes base stations 56, which are each operable to receive data destined for mobile unit 30 over links 53 and wirelessly communicate the data to the mobile unit, assuming the mobile unit is within its serving area 58. In certain embodiments, base stations 56 may also wirelessly receive data for one of servers 20 from mobile unit 30 and send the data towards the server. Base stations 50 may include base station controllers, base transceiver stations, and/or any other type of equipment and/or logic for managing wireless links. Note that each base station 56 is typically operable to wirelessly communicate with multiple mobile units located within its service area 58. It will be recognized that one or more of serving nodes 51 may be servicing one or more of base stations 56.

Base stations 56 include a packet control function (PCF) 57 to manage the sending and receiving of data to and/or from mobile unit 30. PCFs 57 may be logic encoded in media, microcontrollers, application-specific integrated circuits, state machines, and/or any other type of system for manipulating data in a logical manner.

In particular embodiments, radio packet (RP) data sessions may be established over links 53 between base stations 56 and serving nodes 51. Each RP session provides a logical path for a mobile unit data packet session between one of base stations 56 and one of serving nodes 51.

Returning to wireless serving node cluster 50, control nodes 54 are responsible for managing wireless registration requests from PCFs 57 and, if appropriate, selecting serving nodes 51 to manage wireless sessions. As illustrated, control nodes 54 operate in a 1+1 redundancy relationship, although any number of control nodes may be used. Accordingly, while one of control nodes 54 is currently managing registration requests and selecting serving nodes to manage wireless sessions for serving node cluster 50, the other is monitoring and/or receiving updates from it to track its operational state. Thus, if the active control node fails or needs to be taken off-line, the standby control node may take over with minimal loss of service to mobile units. In particular embodiments, control nodes 54 may use the Hot Standby Router Protocol (HSRP) to achieve the redundancy and may be coupled together by their own communication network. In certain embodiments, control nodes 54 may implement load balancing between serving nodes 51, which may require keeping track of the wireless sessions being managed by serving nodes 51 and/or their operational capabilities. Control nodes 54 may or may not themselves manage wireless sessions and may or may not be part of a serving node.

Serving node cluster 60 and RAN 65 have similar components to those of serving node cluster 50 and RAN 55. In brief, therefore, serving node cluster 60 includes wireless serving nodes 61 and control nodes 64, which are coupled to each other for data exchange by communication network 62 and its links 63. Additionally, RAN 65 includes base stations 66, each or which services an area 68 and includes a PCF 67. Note that serving node cluster 60 and RAN 65 do not need to be identical to serving node cluster 50 and RAN 55.

Mobile unit 30 is operable to wirelessly receive data from RANs 55, 65 and may be a wireless telephone, a wireless interface terminal, a wireless personal digital assistant, or any other suitable mobile device operable to provide wireless communication. Mobile unit 30 wirelessly communicates with a base station over a radio frequency (RF) link 32 or other suitable wireless link. Mobile unit 30 may communicate data and associated information to a serving node by in-band and/or out-of-band messaging.

According to one embodiment, RF link 32 is based on established technology, such as IS-95 CDMA, W-CDMA, or CDMA-2000. In a particular embodiment, RF link 32 is a code division multiple access (CDMA) link based on a CDMA standard in which packets are segmented into frames for wireless transmission from mobile unit 30 to a base station, where the frames are reassembled to reconstitute the packets.

Communication system 10 additionally includes a communication network 70, which allows control nodes 54 and control nodes 64, and possibly serving nodes 51 and serving nodes 61, to exchange data with each other. Communication network 70 may be composed of servers, routers, switches, bridges, repeaters, backbones, links, and/or any other suitable type of communication devices. In general, communication network 70 may be any interconnection found on any communication network, such as a WAN, the Internet, or any other data exchange system between more computers. As illustrated, communication network 70 is coupled to communication network 52 and communication network 62 by links 72. Links 72 may be wires, fiber-optic cables, microwave channels, and/or any other suitable type of wireline and/or wireless link. Links 72 may include intermediate servers, routers, switches, repeaters, backbones, and/or other communication devices. In particular embodiments, all or a part of communication network 70 may be part of communication network 40, communication network 52, and/or communication network 62.

Communication system 10 also includes mobile switching centers (MSCs) 80 coupled to base stations 56, 66. MSCs 80 are operable to perform authentication and to set up and disconnect calls for mobile units serviced by the base stations. MSC's 80 are also operable to provide, in conjunction with the base stations, switch and soft hand-off functionality for system 10. In this way, data, such as voice, video, audio, text, and/or any other type of data, may be sent to mobile unit 30 as it moves between areas serviced by the base stations. Accordingly, mobile unit 30 may travel throughout a wide geographic area while maintaining wireless communications. Each MSC 80 includes a subscriber database 82. Subscriber databases 82 may store service level agreements for mobile units and provide the agreements to serving nodes for service management, traffic management, or other appropriate operations. Subscriber databases 82 may also store information relating to mobile units and/or users of mobile units, such as names, addresses, account numbers, account types, and/or any other suitable information.

In particular embodiments of operation, when mobile unit 30 desires a data service, which may, for example, be triggered by the initiation of an application at the mobile unit and/or the activation of the mobile unit, a wireless session is initiated between the mobile unit, a base station, and a serving node. To initiate the wireless session in the illustrated embodiment, PCF 57 of base station 56z generates a wireless registration request and sends it to one or both of control nodes 54. In particular embodiments, the registration request is an A11-Registration Request, possibly with an identifier for the control nodes in the home agent field, although any other appropriate type of registration request may be used.

Upon receiving the registration request, the active one of control nodes 54 determines which serving node cluster should service the mobile unit based on the identity of the mobile unit. To accomplish this, the active control node algorithmically analyzes an identifier for the mobile unit and associates the identifier with a serving node cluster. In particular embodiments, the control node may perform a modulo operation on the identifier of the mobile unit based on the number of clusters to determine the appropriate cluster for the mobile unit, the remainder of the operation providing an index to the appropriate cluster record. In other embodiments, any other hash method or any other algorithmic method may be used on the identifier of the mobile unit. The identifier of the mobile unit may be an International Mobile Subscriber Identifier (IMSI), an Electronic Serial Number (ESN), a Mobile identification number (MIN), or any other appropriate identifier for a mobile unit and/or subscriber.

If serving node cluster 50 is not the appropriate cluster for servicing mobile unit 30, the control node redirects the registration request to the appropriate cluster by generating a wireless registration response containing an identifier for the control nodes of the appropriate cluster. The identifier may be a Media Access Control (MAC) address, an Internet protocol (IP) address, or any other appropriate type of identifier for a control node. In general, the registration response may be any message that directs a PCF or other network element generating and/or processing the request to the proper control node. In particular embodiments, the registration response is an A11-Registration Reply indicating that the registration request is denied, possibly by indicating that the address for the serving node is unknown, and including the IP address for the control node of the appropriate cluster in the Home Agent information element. PCF 57 of base station 56z may then generate another wireless registration request for the mobile unit, but this time, using the identifier for the control node of the appropriate cluster.

Assuming, however, that cluster 50 is the appropriate cluster for mobile unit 30, the active control node 54 is responsible for selecting which of serving nodes 51 will manage the wireless session. To accomplish this, the control node analyzes the registration request to determine the type of data service requested and/or analyzes data about serving nodes 51. In particular embodiments, the control node may examine the loading and/or capabilities of serving nodes 51 to maintain a relatively even distribution of wireless sessions between serving nodes 51. Furthermore, in certain embodiments, the control node may maintain an N30 1 redundancy from the availability perspective for the serving nodes 51. The control node may monitor the status of serving nodes 51 to maintain this redundancy. Once one of serving nodes 51 has been selected, a registration response that contains an identifier for the selected serving node is generated and sent to PCF 57 of base station 56z. The identifier may be a MAC address, IP address, or any other appropriate type of identifier for a wireless serving node. In particular embodiments, the registration response may indicate that the registration request is denied. Upon receiving the registration response, PCF 57 of base station 56z generates another wireless registration request, directed to the selected one of serving nodes 51.

When the selected one of serving nodes 51 receives the wireless registration request from PCF 57 of base station 56z, it determines whether it can establish a wireless session with the mobile unit, possibly based on the availability of resources for managing a wireless session, and, if so, generates a registration response indicating acceptance of the request and sends it to PCF 57 of base station 56z. In particular embodiments, the registration response may be an A11-Registration Reply, although any other appropriate type of registration response may be used. The wireless session may then be established.

If, however, the selected serving node 51 determines that it cannot establish a session with the PCF, the selected serving node may generate a registration response that directs the originating PCF back to the control node. The control node may then select another one of serving nodes 51, possibly after updating data regarding the availability of the originally selected serving node. The originating PCF may also generate another registration request if a predetermined period of time expires before receiving a response from the serving node.

Establishing a wireless session may involve allocating RF resources between the mobile unit and the serving base station, establishing an RP session between the serving base station and the selected serving node, establishing a data link between the mobile unit and the selected serving node, allocating an IP address to the mobile unit, and/or any other appropriate function. In particular embodiments, the selected serving node may also attempt, possibly in conjunction with MSC 80a and/or subscriber database 82a, to authenticate mobile unit 30.

Establishing the data link may include negotiation, validation, privilege determination, and/or profile determination. For example, establishing a data link may involve PCF 57 of base station 56z sending an identifier for the mobile unit, an identifier for a user of the mobile unit, an identifier for base station 56z, an indication of the data service requested, and/or any other appropriate data to the selected serving node. Using this data, the selected serving node, possibly in conjunction with MSC 80a and subscriber data base 82a, may validate the mobile unit, the subscriber, and/or the data service request. Upon validation, the data link between the selected serving node and the serving base station may be negotiated. In particular embodiments, the data link may be serial link, such as, for example, a point-to-point protocol (PPP) link between the selected serving node and the mobile unit. Once the data link is established, the mobile unit may begin receiving data from servers 20.

Assuming that mobile unit 30 has a data link to serving node 51a through base station 56z, if mobile unit 30 moves into area 58 of another one of base stations 56, the active one of control nodes 54 recognizes that mobile unit 30 is communicating with a different one of base stations 56 by receiving a registration request from PCF 57 of the base station serving that area. For example, if mobile unit 30 moves into area 58 of base station 56y, PCF 57 of base station 56y detects the presence of mobile unit 30, generates a wireless registration request for mobile unit 30, and sends this request to control nodes 54. The registration request may include an identifier for the mobile unit, an identifier for the base station, and/or any other appropriate type of data. In particular embodiments, the wireless registration request may be an A11-Registration Request, although any other appropriate type of wireless registration request may be use.

Upon receiving the wireless registration request, the active one of control nodes 54 determines whether cluster 50 is the appropriate cluster for the registration request. If it is not, the control node generates a registration response containing an identifier for the control node of the appropriate cluster and sends the response to PCF 57 of base station 56y, which will then form another registration request, directed to the identified control node.

If, however, the registration request is at the appropriate cluster, as in the example, the control node determines whether the registration request is associated with an active wireless session. The control node may make this determination in particular embodiments by examining a mobility event indicator (MEI) in the registration request, which may have been set by the originating PCF, although any other appropriate type of indicator or technique may be used in other embodiments. Note that if the registration request indicates that there is no wireless session associated with the registration request, the control node may treat the registration request as a request to initiate a wireless session for the mobile unit.

If the control node determines that the registration request is associated with an active wireless session, the control node determines whether one of serving nodes 51 is managing a session associated with the registration request. The control node may accomplish this, for example, by examining a database containing information regarding the wireless sessions that serving nodes 51 are currently managing. If the control node determines that one of serving nodes 51 is managing a wireless session associated with the registration request, which should occur in this instance because mobile unit 30 already had a wireless session established with serving node 51a, the control node generates a registration response containing an identifier for the serving node 51 managing the wireless session. This response is sent to PCF 57 of base station 56y, which generates a wireless registration request directed to the identified one of serving nodes 51. When the serving node that is managing the wireless session receives the registration request, serving node 51a in the example, it may update the data link information for the wireless session and continue managing the wireless session. Accordingly, the data link may be maintained between serving node 51a and mobile unit 30.

If, however, the control node determines that one of serving nodes 51 is not managing a wireless session associated with the registration request, which could occur, for example, if the session information at the control node is not complete or if a cluster has recently been added to system 10, the control node selects one of serving nodes 51 to manage the wireless session and generates a wireless session response containing the identifier for the selected one of serving nodes 51. Upon receiving the registration response, PCF 57 of base station 56y generates another registration request directed to the selected serving node and a new data link is established.

Assume now that mobile unit 30 moves into area 68 of base station 66a after having established a data link to serving node 51a. When base station 66a detects mobile unit 30, PCF 67 generates a wireless registration request for the mobile unit and sends the request to control nodes 64. Upon receiving the registration request, the active one of control nodes 64 determines whether cluster 60 is the appropriate cluster for the mobile unit. If it is not, which is the situation here, the active control node 64 generates a registration response containing the identifier for the control nodes of the appropriate cluster, control nodes 54 in the present example. The registration response is sent to PCF 67 of base station 66a, which generates another registration request, this time, however, directed to control nodes 54. Upon receiving the registration request, the active one of control nodes 54 indicates the appropriate one of serving nodes 51 to PCF 67 of base station 66a, serving node 51a in this example, and the established data link may be updated.

The illustrated embodiment of the present invention has several technical features. For example, a control node that receives a wireless registration request for a mobile unit attempts to determine the appropriate cluster to manage wireless sessions for the mobile unit by using an algorithmic approach on its identifier. Thus, the management of mobile units may be distributed between serving node clusters. Moreover, by associating mobile units with clusters using an algorithmic approach, signaling between clusters may be reduced, allowing clusters of different sizes to operate with each other. Furthermore, by directing registration requests for a mobile to a particular serving node cluster, a data link that may exist in the cluster may be maintained. Accordingly, a new data link does not have to be established to the mobile unit, which will decrease the time in which data cannot be transmitted. Additionally, because the serving nodes do not have to store data about the wireless sessions being managed by the other serving nodes in the cluster and/or do not have to try to select a serving node to manage a wireless session, the memory and processing resources of the serving nodes may be utilized for managing data to and from the mobile units. Furthermore, additional serving nodes may be added to a serving node cluster without significant effect on the capabilities of the serving nodes already in the cluster. Additionally, because serving nodes and control nodes do not have to be co-located, a serving node cluster is easy to configure. Furthermore, if the control nodes use a standards compliant RP interface, the structure of the cluster is transparent to the PCFs and serving nodes, allowing wide use of the current configuration. Moreover, this may allow continuity of wireless data network operation in the event that a large number of control nodes fail, via reconfiguration of control node identifiers in the PCFs and the serving nodes.

In certain embodiments, the management of wireless sessions by the clusters may be distributed in an uneven, yet controlled manner. For example, if the modulo operation is based on a number larger than the number of serving node clusters, then an identifier for a particular cluster may be associated with more than one remainder, allowing that serving node cluster to receive an increased number of wireless registration requests. This may be particularly useful when different clusters have different capabilities.

In particular embodiments, PCFs may assist in directing the initial wireless registration request to the control node of the appropriate cluster by implementing an algorithm similar to the one used by the control nodes. Thus, PCFs may help to minimize redirections between controllers of clusters.

Note that the addition and/or deletion of another serving node cluster to system 10 will probably disturb the distribution of wireless sessions among serving node clusters. For example, for embodiments that use the modulo operation on the identifier of a mobile unit, increasing the number of clusters by one in the operation will probably result in a different remainder and, hence, cluster, for serving the mobile unit. Thus, a wireless registration request for a mobile unit having an active session at the time of the modification may be directed to a cluster that is not managing a wireless session for the mobile unit. Accordingly, a new data link may have to be established in these circumstances. However, once the new data link is established, it may remain anchored in the new serving node cluster until there is another change in serving node clusters, which may take place on the time frame of weeks or months. Moreover, mobile units that do not have wireless sessions at the time of the modification will probably not notice a change as the data link establishment procedure, although to a different cluster, will probably remain the same. In particular embodiments, control nodes and/or serving nodes may be configured through the use of command line interface (CLI) commands.

Figures 2, 3, 4:
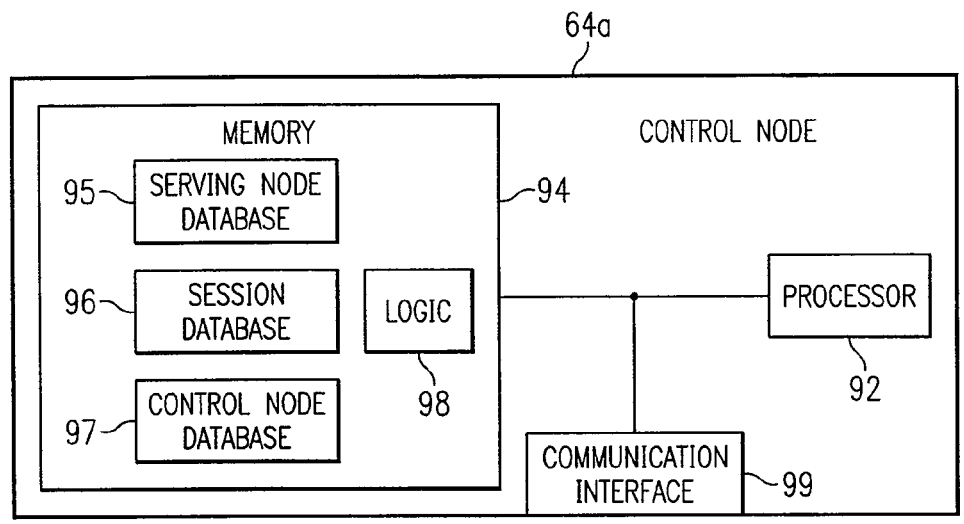
FIG. 2 is a block diagram illustrating one embodiment of a control node for the communication system in FIG. 1.
FIG. 3 illustrates one embodiment of a session database for the control node in FIG. 2.
FIG. 4 illustrates one embodiment of a control node database for the control node in FIG. 2.

FIG. 2 is a block diagram illustrating one embodiment of control node 64a for communication system 10. In this embodiment, control node 64a includes a processor 92, a memory 94, and a communication interface 99. Memory 94, which is coupled to processor 92, includes a serving node database 95, a session database 96, a control node database 97, and a set of logic 98 for processor 92. Communication interface 99 is coupled to memory 94 and processor 92 and allows control node 64a to communicate with communication network 62, and hence, base stations 64 and serving nodes 61.

In operation, processor 92, according to logic 98, receives a registration request for cluster 60 and analyzes it. Based on the analysis, processor 92 generates a message informing the element that generated the registration request of the appropriate control node for the registration request or of one of serving nodes 61 for managing the wireless session associated with the registration request, possibly after selecting one of serving nodes 61.

For example, if the registration request is associated with another cluster, such as, for example, when mobile unit 30 establishes a data link in cluster 50 and moves to cluster 60, processor 92 determines an identifier for control nodes 54 by algorithmically analyzing an identifier of the mobile unit and a list of control nodes in control node database 97. Control node 64a may poll and/or receive updates regarding other control nodes through communication network 70. The updates may be regularly scheduled or as needed and may be sent by multicast, unicast, state information exchange, or any other appropriate technique.

As another example, if the registration request indicates that a wireless session exists for the mobile unit and the registration request is at the appropriate control node, processor 92 may determine whether one of serving nodes 61 is managing a wireless session associated with the registration request by examining session database 96.

As a further example, if the registration request indicates that a new wireless session is desired and the registration request is at the appropriate control node, processor 92 may select one of serving nodes 61 to manage the wireless session by examining the data in serving node database 95, and possibly session database 96.

Control node 64a may poll and/or receive updates from serving nodes 61 to maintain serving node database 95 and/or session database 96. The data exchange may be scheduled and/or as needed and may take place using multicast, unicast, state information exchange, or any other appropriate messaging technique. In particular embodiments, the messaging between control node 64a and serving nodes 61 may use A11-Registration Requests and A11-Registration Replies.

FIG. 3 illustrates one embodiment of session database 96 for control node 64a. As illustrated, session database 96 includes columns 102. Column 102a includes the identifier for the mobile unit associated with a session. The identifier in column 102a may be an IMSI, an ESN, a MIN, or any other appropriate identifier for a mobile unit and/or subscriber. Column 102b includes an identifier for the serving node to which the mobile unit is anchored, and column 102c includes time information about the session, such as, for example, when the wireless session was established, how much time has elapsed since the wireless was established, and/or any other appropriate timing parameters of the wireless session. Accordingly, by searching column 102a, processor 92 may determine if one of serving nodes 61 is managing a wireless session associated with the registration request and, if so, an identifier for the serving node managing the wireless session.

Although FIG. 3 illustrates one embodiment of session database 96, other embodiments may have less, more, and/or a different arrangement of data. For example, in some embodiments, session database 96 may include a session identifier, which could be used locally to designate wireless sessions. As another example, in certain embodiments, session database 96 may include service and/or traffic management parameters for mobile units. As a further example, in particular embodiments, session database 96 may include session status indicators for each session. As still a further example, in some embodiments, the time data is not required.

FIG. 4 illustrates one embodiment of control node database 97 for control node 64a. As illustrated, control node database 97 includes columns 104. Column 104a contains an integer index of the control nodes about which control node 64a knows. Column 104b includes a control node identifier associated with each integer in column 104a. In particular embodiments, performing a modulo operation on an identifier for the mobile unit based on the number of clusters will produce the integer value in column 104a of the control node associated with the wireless registration request. Thus, processor 92 may determine the identifier of the control node by cross-referencing to column 104b.

Although FIG. 4 illustrates one embodiment of control node database 97, other embodiments may have less, more, and/or a different arrangement of data. For example, in some embodiments, control node database 97 may not include column 104a, especially if the remainder of the module operation is used as an index to column 104b. As a further example, in certain embodiments, control node database 97 may include multiple entries for one or more control nodes. Thus, the loading between the clusters may be altered using control node database 97. As a further example, in particular embodiments, control node database 97 may include status indicators for each control node in column 104b.

Serving node database 95 may contain any of a variety of data regarding serving nodes 61. For example, serving node database 95 may contain data regarding identifiers for serving nodes 61, the type of each of serving nodes 61, the status of each of serving nodes 61, the loading of each of serving nodes 61, and/or the capacity of each of serving nodes 61. Thus, when processor 92 attempts to select one of serving nodes 61 to manage a wireless session, processor 92 can attempt to balance the load between serving nodes 61 based on their respective capacities and/or current load. Note that the processor may determine the current load on serving nodes 61 or having it downloaded by the serving nodes, and the load on a serving node may depend on CPU usage, memory usage, occupancy, bandwidth usage, and/or any other appropriate factor.

The components of serving node 64a may have a variety of forms and/or arrangements. For example, processor 92 may be a microprocessor, a microcontroller, a field-programmable gate array, a biological computer, an atomic computer, and/or any other type of device for manipulating data in a logical manner. As another example, memory 94 may include random access memory (RAM), read-only memory (ROM), compact disk read-only memory (CD-ROM), and/or any other type of volatile or non-volatile electromagnetic or optical data storage device. Databases 95-97 in memory 94 may be organized as relational, flat, network, and/or hierarchical databases or may have any other logical association of data. In certain embodiments one or more of databases 95-97 may be part of the same database. In particular embodiments, all or a part of memory 94 may be encoded on processor 92. As a further example, communication interface 99 may be a network interface card, a transceiver, a port, a modem, and/or any other type of device for sending data to and receiving data from a communication network.

FIG. 5 is a flowchart 500 illustrating operations of a control node, such as, for example, control node 54a, in accordance with one embodiment of the present invention. At decision block 508, the control node waits to receive a wireless registration request, which may have been generated by a packet control function, a mobile unit, or other appropriate network element. In particular embodiments, the registration request may be an A11-Registration Request, although any other appropriate type of registration request may be used. Upon receiving a registration request, the control node determines the control node associated with the registration request at function block 512. In particular embodiments, the control node may make this determination by performing a modulo operation on an identifier for the mobile unit based on a number associated with loading between clusters.

At decision block 516, the control node determines whether it is the control node associated with the registration request. If the control node is not the control node associated with the registration request, the control node generates a registration response containing the identifier for the control node associated with the registration request at function block 520. In particular embodiments, the registration response may be an A11-Registration Reply indicating that the registration request has been denied. The registration response may then be sent to the network element that generated the registration request. The operations of the control node for this registration request are then at an end.

If, however, the control node determines that it is the control associated with the registration request, the control node determines whether the registration request is for a new wireless session at decision block 524. In particular embodiments, the control node makes this determination by examining an MEI in the registration request, although any other appropriate indicator or technique may be used. If the control node determines that the registration request is for a new wireless session, the control node selects a serving node in the cluster to manage the wireless session at function block 528. In particular embodiments, the control node may examine the current loading of each of the serving nodes in the cluster in selecting the serving node to manage the session. Thus, the control node may maintain load balancing between the serving nodes. At function block 532, the control node generates a registration response with an identifier for the selected serving node. The registration response may then be sent to the PCF and/or mobile unit that generated the registration request. The operations of the control node are then at an end for this registration request.

If, however, the control node determines that the registration request is not for a new session, indicating that a wireless is already established for mobile unit, the control node determines whether there is a wireless session associated with the registration request at decision block 536. In particular embodiments, the control node may make this determination by examining a wireless session database containing data regarding the sessions being managed by serving nodes in the cluster, such as, for example, session database 96. If there is a wireless session associated with the registration request, the control node generates a registration response containing an identifier for the serving node managing the wireless session at decision function block 540. The registration response may then be sent to the PCF and/or mobile unit that originated the registration request. The functions of the control node with respect to this registration request are then at an end. If, however, there is no wireless session associated with the registration request, the control node proceeds to function block 528 to select a serving node for the registration request.

Although flowchart 500 illustrates the operations of a control node in accordance with one embodiment of the present invention, other embodiments may include less, more, and/or a different arrangement of operations. For example, in some embodiments, a control node may determine whether the registration request is for a new wireless session before determining whether it is the associated control node. As another example, in certain embodiments, a control node may not select a serving node if there is no wireless session associated with a registration request indicating that it is associated with an active wireless session, forcing the PCF to generate a wireless registration request for a new session if the mobile unit still desires a session.

While the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for identifying a wireless serving node for a mobile unit, comprising:
   detecting a mobile unit in the vicinity of a base station;
   determining that the mobile unit desires to establish a wireless data session;
   determining a serving node cluster to manage the wireless session;
   generating a wireless registration request for the mobile unit;
   determining, at a control node for the serving node cluster, whether a serving node in the serving node cluster is managing the wireless session associated with the registration request if the control node is the control node associated with the registration request and the registration request is not for a new wireless session; and
   selecting, at the control node for the serving node cluster, a serving node in the serving node cluster to manage the wireless session if the control node is the control node associated with the registration request and the registration request is for a new wireless session.

2. The method of claim 1, wherein determining a serving node cluster to manage the wireless session comprises determining an identifier for a control node of the serving node cluster.

3. The method of claim 2, wherein the identifier of the control node is an Internet protocol address.

4. The method of claim 1, wherein the registration request comprises an A11-Registration Request.

5. The method of claim 1, further comprising:
   receiving a message regarding a control node; and
   updating a database containing information regarding control nodes, the database containing identifiers for control nodes.

6. The method of claim 1, wherein determining a serving node cluster to manage the wireless session comprises performing a hash method on the mobile unit identifier.

7. The method of claim 6, wherein determining a serving node cluster to manage the wireless session further comprises performing a modulo operation on the mobile unit identifier, using a number associated with the loading between serving node clusters as the basis for the operation and the remainder of operation as an index into a database containing identifiers for control nodes.

8. A set of logic for identifying a wireless serving node for a mobile unit, the logic encoded in media and operable to:
   detect a mobile unit in the vicinity of a base station;
   determine that the mobile unit desires to establish a wireless data session;
   determine a serving node cluster to manage the wireless session;
   generate a wireless registration request for the mobile unit;
   determine, at a control node for the serving node cluster, whether a serving node in the serving node cluster is managing the wireless session associated with the registration request if the control node is the control node associated with the registration request and the registration request is not for a new wireless session; and
   select, at the control node for the serving node cluster, a serving node in the serving node cluster to manage the wireless session if the control node is the control node associated with the registration request and the registration request is for a new wireless session.

9. The logic of claim 8, wherein determining a serving node cluster to manage the wireless session comprises determining an identifier for a control node of the serving node cluster.

10. The logic of claim 9, wherein the identifier of the control node is an Internet protocol address.

11. The logic of claim 8, wherein the registration request comprises an A11-Registration Request.

12. The logic of claim 8, wherein the logic is further operable to:
  receive a message regarding a control node; and
  update a database containing information regarding control nodes, the database containing identifiers for control nodes.

13. The logic of claim 8, wherein determining a serving node cluster to manage the wireless session comprises performing a hash method on the mobile unit identifier.

14. The logic of claim 13, wherein determining a serving node cluster to manage the wireless session further comprises performing a modulo operation on the mobile unit identifier, using a number associated with the loading between serving node clusters as the basis for the operation and the remainder of operation as an index into a database containing identifiers for control nodes.

15. A system for identifying a wireless serving node for a mobile unit, comprising:
  means for detecting a mobile unit in the vicinity of a base station;
  means for determining that the mobile unit desires to establish a wireless data session;
  means for determining a serving node cluster to manage the wireless session;
  means for generating a wireless registration request for the mobile unit;
  means for determining, at a control node for the serving node cluster, whether a serving node in the serving node cluster is managing the wireless session associated with the registration request if the control node is the control node associated with the registration request and the registration request is not for a new wireless session; and
  means for selecting, at the control node for the serving node cluster, a serving node in the serving node cluster to manage the wireless session if the control node is the control node associated with the registration request and the registration request is for a new wireless session.

16. A method for identifying a wireless serving node for a mobile unit, comprising:
  receiving a wireless registration request at a control node for a wireless serving node cluster;
  analyzing a mobile unit identifier to determine a control node associated with the registration request, wherein analyzing the mobile unit identifier comprises performing an algorithm on the mobile unit identifier;
  generating a wireless registration response containing an identifier for the control node associated with the registration request if the control node is not the control node associated with the registration request;
  determining, at the control node, whether a serving node in the wireless serving node cluster is managing a wireless session associated with the registration request if the control node is the control node associated with the registration request and the registration request is not for a new wireless session;
  selecting, at the control node for the wireless serving node cluster, a serving node in the wireless serving node cluster to manage the wireless session if the control node is the control node associated with the registration request and the registration request is for a new wireless session.

17. The method of claim 16, further comprising:
  receiving a message regarding wireless sessions being managed by a serving node in the wireless serving node cluster; and
  updating a database containing information regarding wireless sessions being managed by serving nodes in the wireless serving node cluster.

18. The method of claim 17, further comprising receiving messages regarding load and wireless sessions for every serving node in the wireless serving node cluster.

19. The method of claim 16, further comprising:
  determining whether a serving node in the wireless serving node cluster is managing a wireless session associated with the registration request if the control node is the control node associated with the registration request; and
  generating a wireless registration response containing an identifier for the serving node managing the wireless session if a serving node in the wireless serving node cluster is managing a wireless session associated with the registration request.

20. The method of claim 19, wherein determining whether a serving node in the wireless serving node cluster is managing a wireless session associated with the registration request comprises accessing a database containing wireless session information for serving nodes in the wireless serving node cluster.

21. The method of claim 16, further comprising:
  selecting a serving node in the wireless serving node cluster to manage the wireless session if the control node is the control node associated with the registration request; and
  generating a wireless registration response containing an identifier for the selected serving node.

22. The method of claim 21, wherein selecting a serving node in the wireless serving node cluster to manage the wireless session comprises maintaining load balancing between the serving nodes.

23. The method of claim 16, further comprising:
  generating, if a serving node in the wireless serving node cluster is managing a wireless session associated with the registration request, a wireless registration response containing an identifier for the serving node managing the wireless session; and
  generating a wireless registration response containing an identifier for the selected serving node.

24. The method of claim 16, wherein the registration request comprises an A11-Registration Request.

25. The method of claim 16, further comprising:
  receiving a message regarding a control node of another wireless serving node cluster; and
  updating a database containing information regarding control nodes, the database containing identifiers for control nodes.

26. The method of claim 16, wherein determining a control node associated with the registration request by using an algorithm on a mobile unit identifier in the registration request comprises performing a hash method on the mobile unit identifier.

27. The method of claim 26, wherein determining a control node associated with the registration request by using an algorithm on a mobile unit identifier in the registration request further comprises performing a modulo operation on the mobile unit identifier, using a number associated with the loading between wireless serving node clusters as the basis for the operation and the remainder of operation as an index into a database containing identifiers for control nodes.

28. The method of claim 16, wherein the identifier of the associated control node is an Internet protocol address.

29. A set of logic for identifying a wireless serving node for a mobile unit, the logic encoded in media and operable to:
- receive a wireless registration request at a control node for a wireless serving node cluster;
- analyze a mobile unit identifier to determine a control node associated with the registration request, wherein analyzing the mobile unit identifier comprises performing an algorithm on the mobile unit identifier;
- generate a wireless registration response containing an identifier for the control node associated with the registration request if the control node is not the control node associated with the registration request; and
- determine, at the control node, whether a serving node in the wireless serving node cluster is managing a wireless session associated with the registration request if the control node is the control node associated with the registration request and the registration request is not for a new wireless session; and
- select, at the control node for the wireless serving node cluster, a serving node in the wireless serving node cluster to manage the wireless session if the control node is the control node associated with the registration request and the registration request is for a new wireless session.

30. A system for identifying a wireless serving node for a mobile unit, comprising:
- means for receiving a wireless registration request at a control node for a wireless serving node cluster;
- means for analyzing a mobile unit identifier to determine a control node associated with the registration request, wherein analyzing the mobile unit identifier comprises performing an algorithm on the mobile unit identifier;
- means for generating a wireless registration response containing an identifier for the control node associated with the registration request if the control node is not the control node associated with the registration request; and
- means for determining, at the control node, whether a serving node in the wireless serving node cluster is managing a wireless session associated with the registration request if the control node is the control node associated with the registration request and the registration request is not for a new wireless session;
- means for selecting, at the control node for the wireless serving node cluster, a serving node in the wireless serving node cluster to manage the wireless session if the control node is the control node associated with the registration request and the registration request is for a new wireless session.

* * * * *